(12) United States Patent
Ajo et al.

(10) Patent No.: US 7,948,747 B2
(45) Date of Patent: May 24, 2011

(54) HARD DRIVE RAIL FOR HARD DRIVE CARRIER

(75) Inventors: David M. Ajo, Berkeley, CA (US); Anthony Sanchez, Round Rock, TX (US); David W. Williams, Salado, TX (US)

(73) Assignee: Dell Products L.P., Round Rock, TX (US)

(*) Notice: Subject to any disclaimer, the term of this patent is extended or adjusted under 35 U.S.C. 154(b) by 82 days.

(21) Appl. No.: 12/554,266

(22) Filed: Sep. 4, 2009

(65) Prior Publication Data
US 2011/0058328 A1    Mar. 10, 2011

(51) Int. Cl.
*G06F 1/16*    (2006.01)
(52) U.S. Cl. .............. 361/679.33; 29/846; 345/178; 455/550.1; 360/97.01
(58) Field of Classification Search ............. 29/846, 29/25.35, 594; 345/8, 173, 156, 76, 205, 345/178, 636, 211; 235/462.41; 360/97.01; 248/581; 206/320, 701; 455/410, 556.1, 455/550.1, 566, 41.2; 361/679.02, 679.33, 361/679.34, 679.31, 679.37, 679.55, 679.21, 361/679.41, 679.32, 679.6, 679.26, 679.43
See application file for complete search history.

(56) References Cited

U.S. PATENT DOCUMENTS

| | | | |
|---|---|---|---|
| 5,187,643 A | 2/1993 | I-Shou | |
| 5,349,483 A | 9/1994 | Tsai | |
| 5,572,402 A | 11/1996 | Jeong | |
| 6,404,642 B1 | 6/2002 | Greenfield et al. | |
| 6,600,648 B2 | 7/2003 | Curlee et al. | |
| 6,661,651 B1* | 12/2003 | Tanzer et al. | 361/679.33 |
| 2007/0040034 A1* | 2/2007 | Hennick et al. | 235/462.41 |
| 2008/0278904 A1* | 11/2008 | Carr et al. | 361/685 |
| 2010/0257732 A1* | 10/2010 | Ziberna | 29/846 |

* cited by examiner

*Primary Examiner* — Hung V Duong
(74) *Attorney, Agent, or Firm* — Haynes and Boone, LLP (57) ABSTRACT

A rail apparatus includes first plate formed of a synthetic material having a first face and a second face opposite the first face, the first plate having a plurality of rows of spaced apart rail protrusions in a first pattern protruding from the second face of the first plate. A second metal plate includes a first face and a second face opposite the first face, the second plate having a plurality of rows of spaced apart slots in a second pattern matching the first pattern and extending through the first and second faces of the second plate. The second face of the first plate abutting the second face of the second plate, whereby the rows of rail protrusions extend through the slots and extend from the first face of the second plate.

20 Claims, 12 Drawing Sheets

HARD DRIVE RAIL FOR HARD DRIVE CARRIER

BACKGROUND

The present disclosure relates generally to information handling systems, and more particularly to a rail for a hard drive carrier.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

The overlying problem addressed by this disclosure is that as hard disk drive (HDD) density increases, the physical mounting of HDDs in an HDD bay becomes more challenging due to space constraints in the server chassis. These space constraints are especially restrictive in the application where the bottom of the HDD occupying the bottom slot in an HDD bay is very close to the bottom of the server chassis. Although there is very little space in which to fit guiding features for the HDDs occupying the bottom slots in the HDD bays, having this guiding feature is crucial. Misalignment of the bottom HDD due to insufficient guiding features can damage both the HDD and the entire HDD backplane, which is costly to replace in the field. This disclosure provides mounting rails for the bottom HDDs in a tight space, a problem that cannot be solved using prior technology such as zippies or individual rails roll-riveted to a sheet metal wall.

The other corollary to the problem of mounting HDDs in a space-constrained server chassis is the challenge of adequately controlling the spacing between adjacent HDDs in the same HDD bay. The tolerances that govern the gaps between HDDs that are stacked one above the other in the same HDD bay are very tight. As a result, the tolerances of the features that guide the HDDs into their proper position or slot in the HDD bay must also be tightly controlled. If individual rails attached to a sheet metal bay wall are used to guide the HDDs into their proper slots in the HDD bay, the associated tolerance stackup between the rails of adjacent HDDs will be multiplied by the number of HDDs in one stack. Once again, this problem becomes more pronounced as server HDD density increases. The current disclosure solves this tolerance stackup problem by incorporating all of the guiding features on one side of the HDD bay into one plastic part, which is attached to the sheet metal bay wall. Thus, the tolerance stackup between HDD guiding features remains fixed, regardless of the number of HDDs in the HDD bay.

Accordingly, it would be desirable to provide an improved rail for a hard drive carrier absent the disadvantages discussed above.

SUMMARY

According to one embodiment, a rail apparatus includes a first plate formed of a synthetic material having a first face and a second face opposite the first face, the first plate having a plurality of rows of spaced apart rail protrusions in a first pattern protruding from the second face of the first plate. A second metal plate includes a first face and a second face opposite the first face, the second plate having a plurality of rows of spaced apart slots in a second pattern matching the first pattern and extending through the first and second faces of the second plate. The second face of the first plate abutting the second face of the second plate, whereby the rows of rail protrusions extend through the slots and extend from the first face of the second plate.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
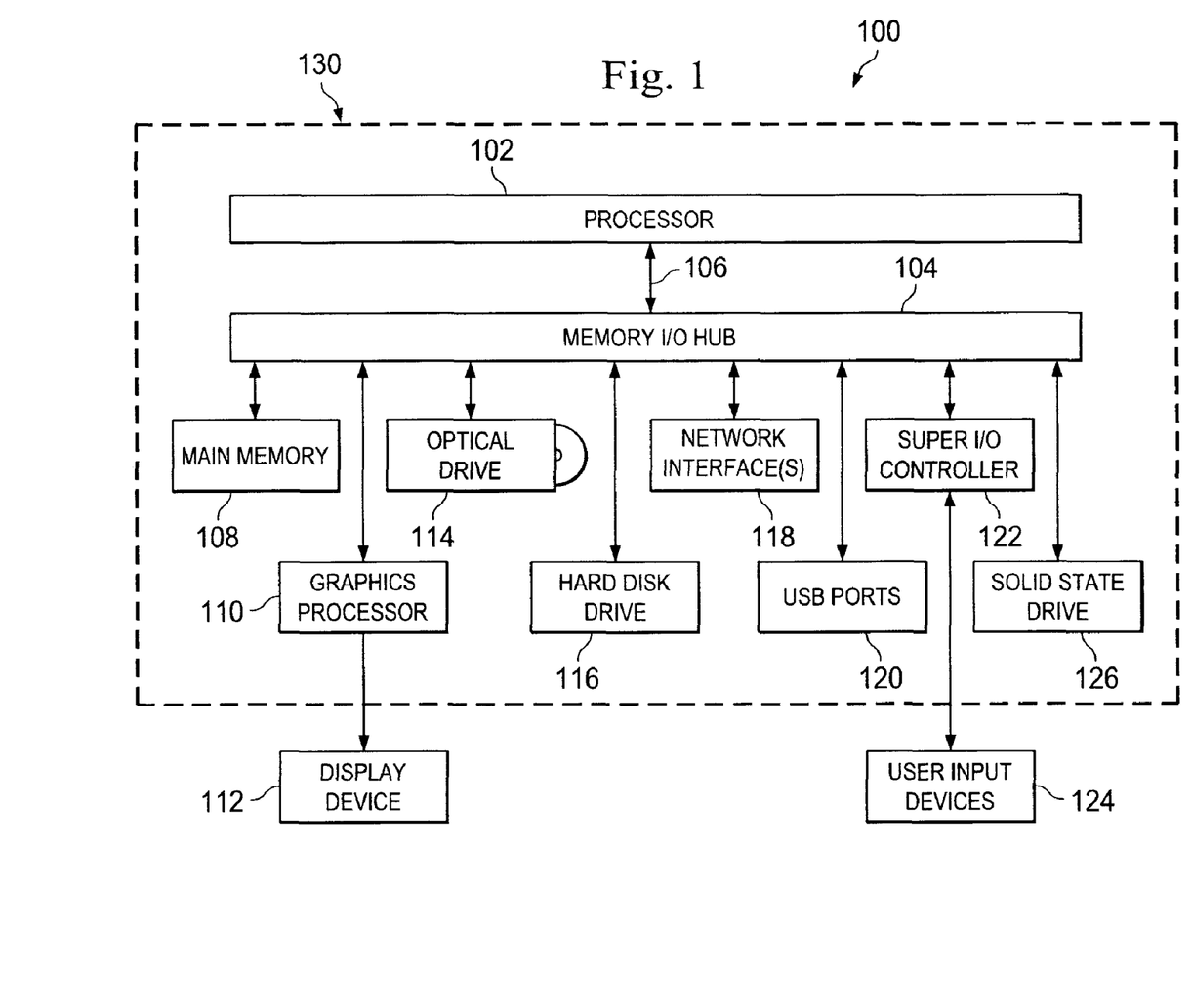
FIG. 1 is a diagrammatic view illustrating of an embodiment of an IHS.

FIG. 1 is a block diagram of an IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116 and 126 may be located locally with the IHS 100, located remotely from the IHS 100, and/or they may be virtual with respect to the IHS 100. Portions of the system 100 are provided in an IHS chassis 130, FIG. 1. Other parts of the system 100 such as display 112 and input devices 124, such as a mouse and a keyboard for example are peripherally attached to the system 100.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

Figure 2:
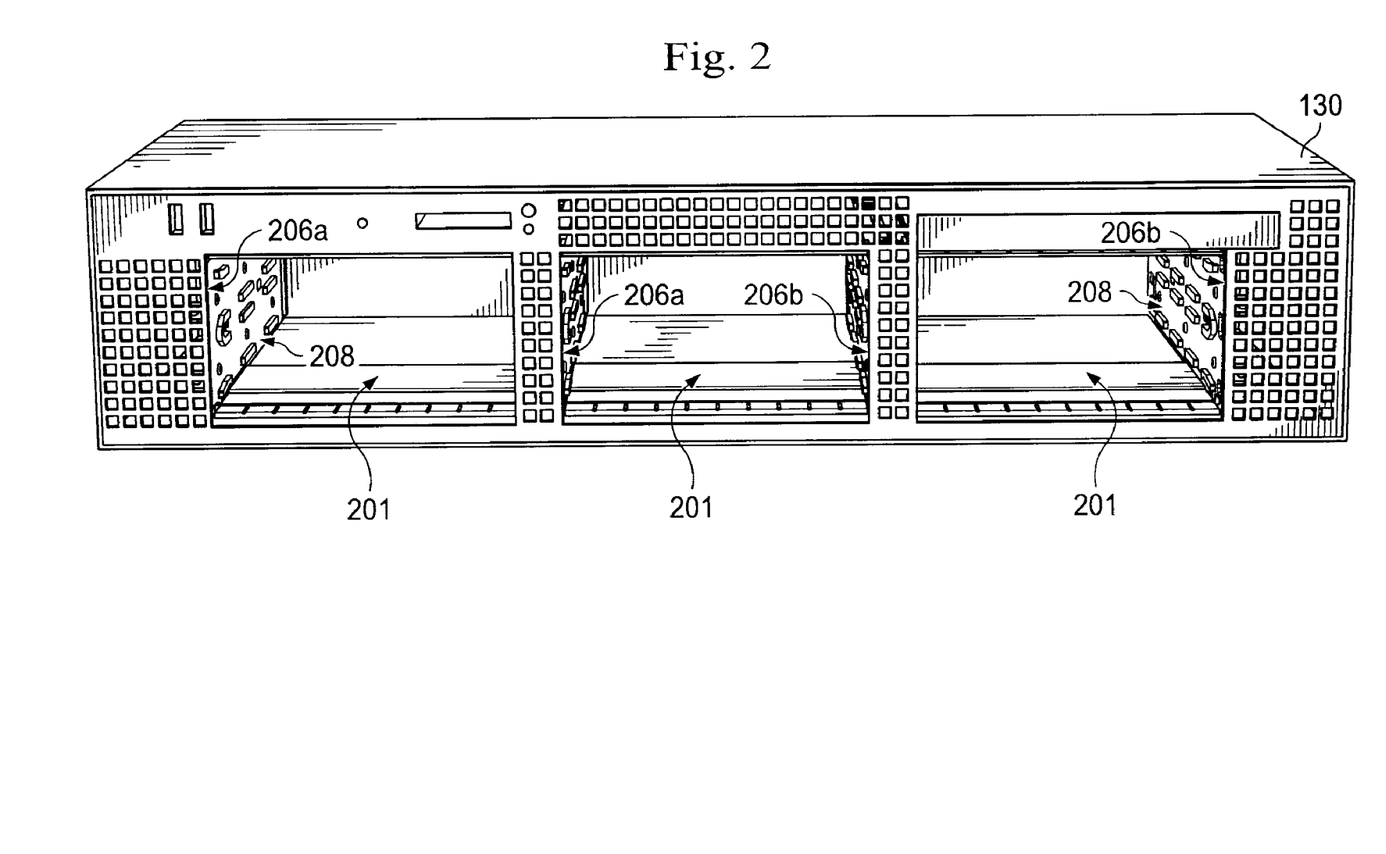
FIG. 2 is a perspective view illustrating an embodiment of an IHS chassis including a plurality of media bays for hard drives or other media.
Figure 3:
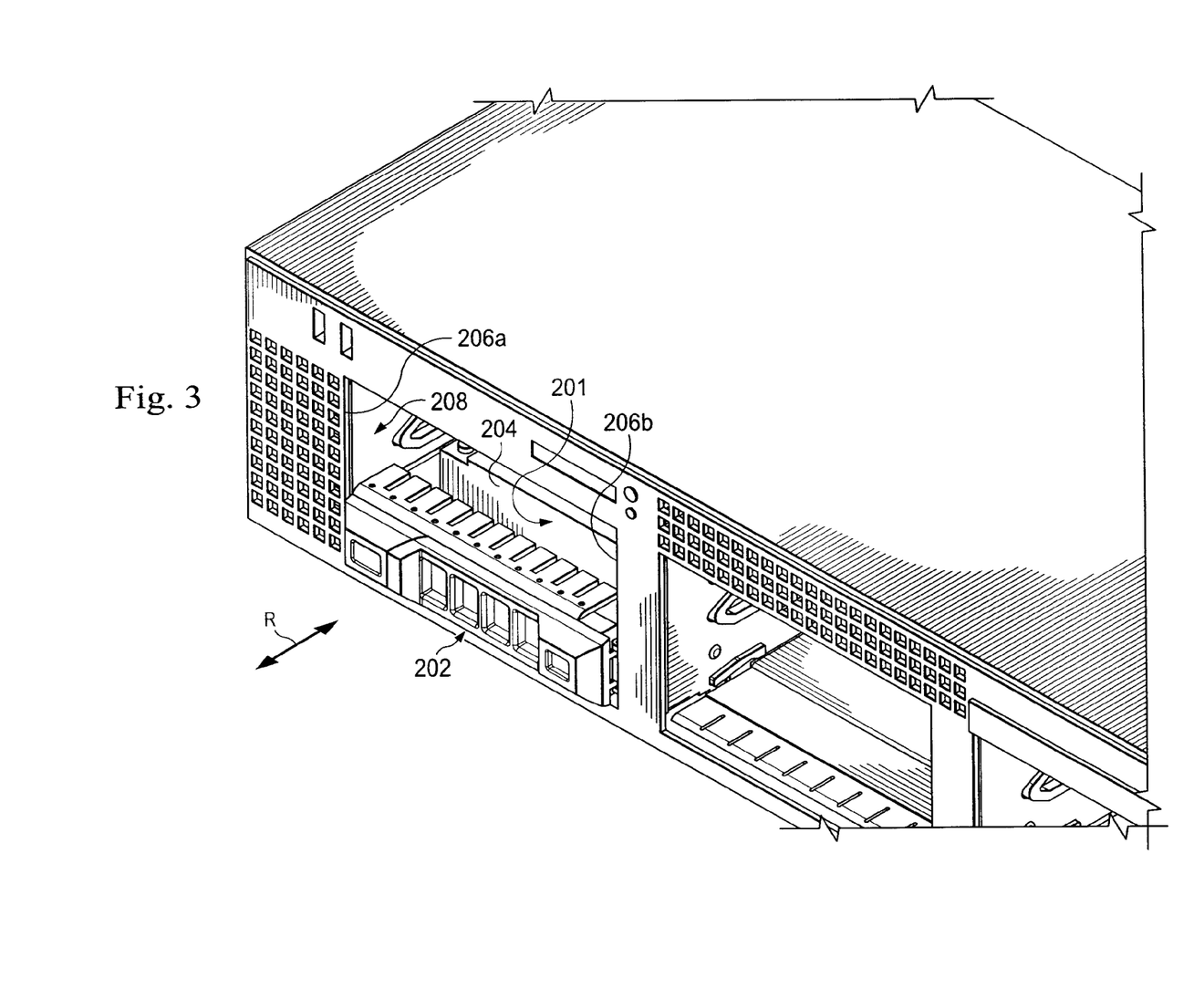
FIG. 3 is a perspective view illustrating an embodiment of an IHS chassis including a media bay having a media carrier inserted therein.
Figure 4:
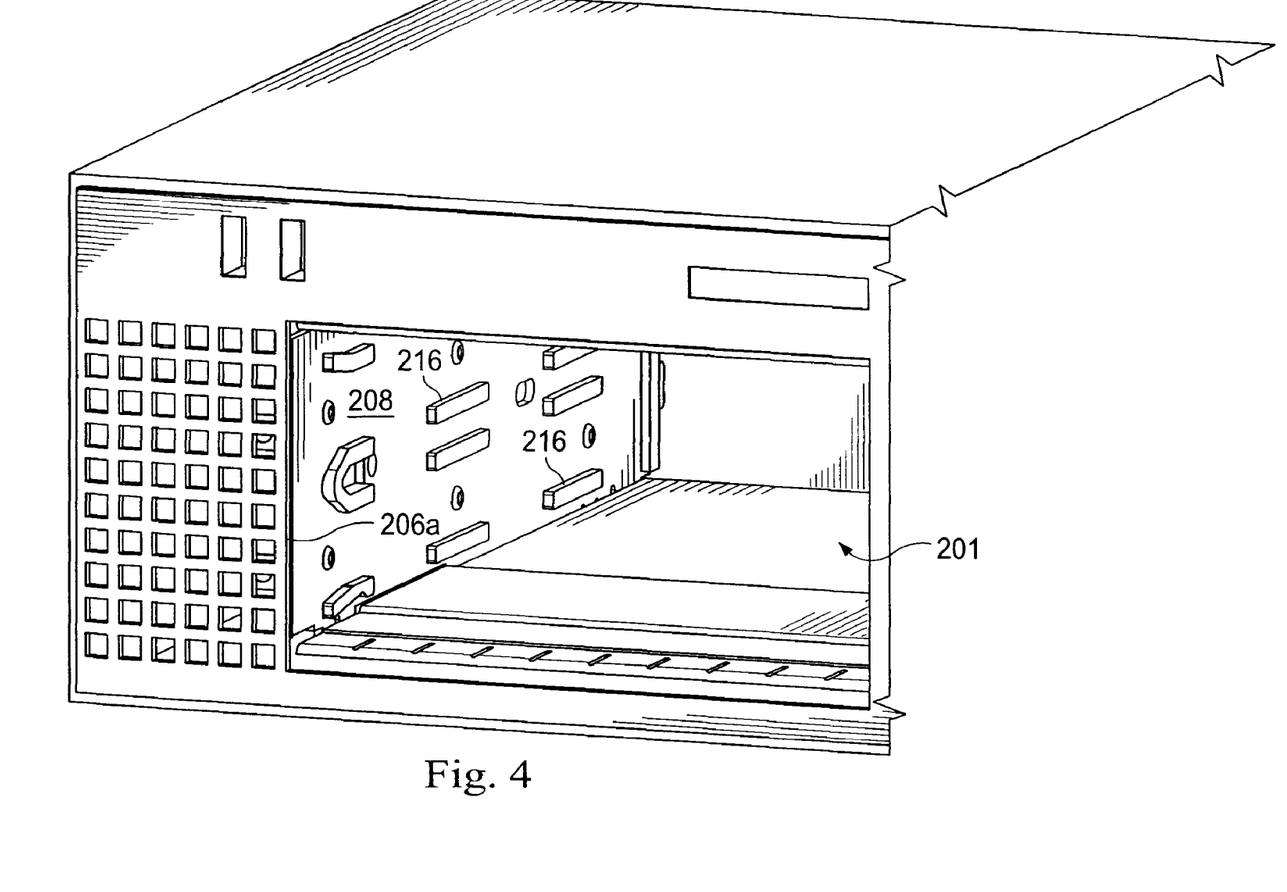
FIG. 4 is a partial perspective view illustrating a media bay in an IHS chassis.
Figure 5:
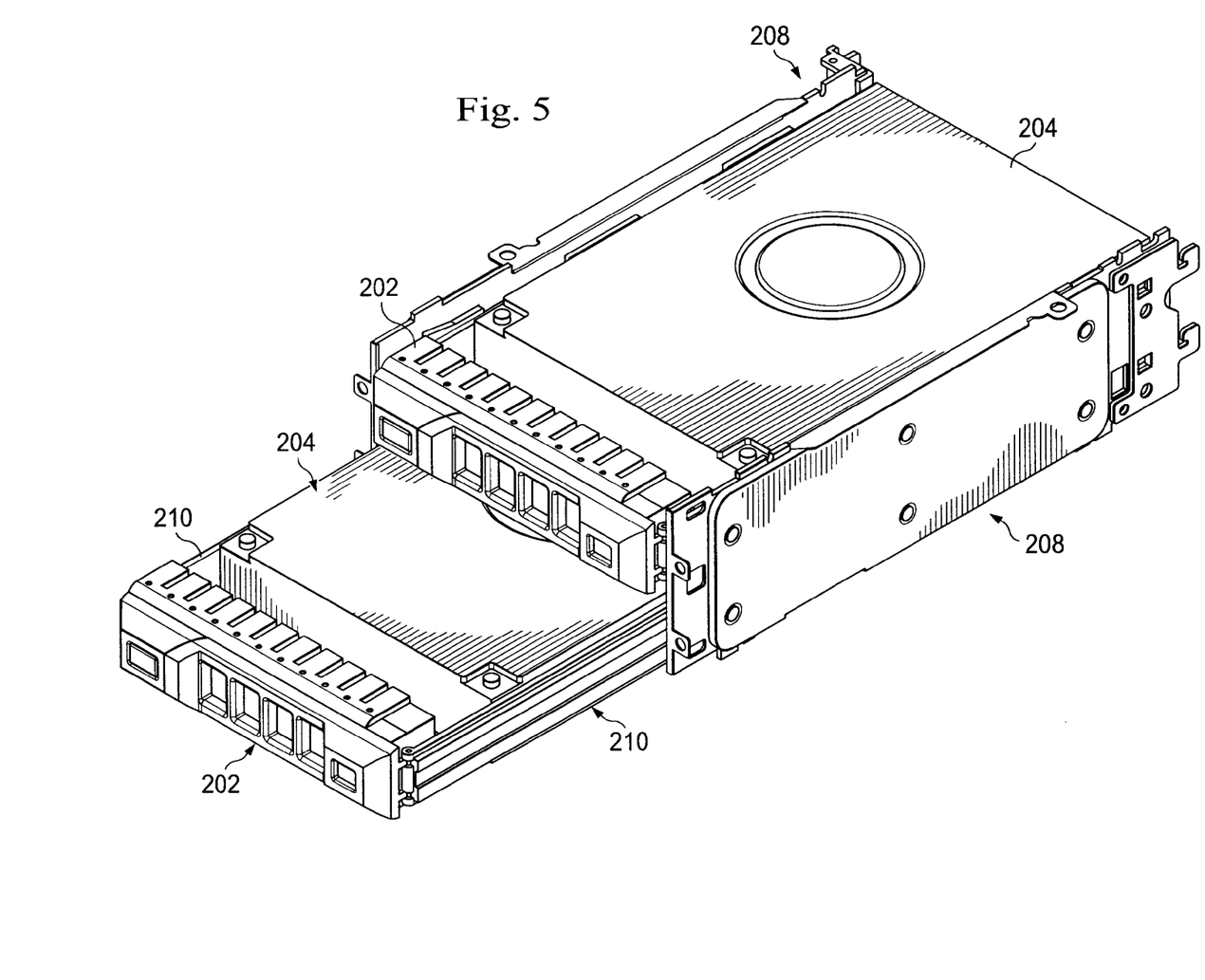
FIG. 5 is a perspective view illustrating an embodiment of media bays for housing multiple media carriers.

An exemplary chassis 130, mentioned above, is further illustrated in FIG. 2, including a plurality of hard drive (or other media) bays 201. In FIG. 3, one of the bays 201 may include one or more hard drive carriers 202 mounted in the bay 201. The carrier supports a media storage device such as a hard drive module 204. Each bay 201, FIGS. 2, 3 and 4 includes opposite sides 206a and 206b. Each side 206a, 206b includes a hard drive rail apparatus including compound plates 208 which support the carrier 202 in a reciprocal sliding motion, in a direction designated R, FIG. 3, as the carrier 202 is inserted and removed from a respective bay 201. Each carrier 202, FIG. 5 also includes sidewalls 210 having grooves 210a, FIG. 5a which have sliding contact with the compound plates 208 as will be discussed in further detail below.

Each compound plate 208, FIGS. 6a, 6b, 6c, 6d includes a first plate 208a formed of a synthetic material having a first face 212 and a second face 214 opposite the first face 212. Also, the first plate 208a includes a plurality of rows of spaced apart rail protrusions 216 in a first interrupted linear pattern protruding from the second face 214. Each compound plate 208 also includes a second plate 208b formed of a metal. Second plate 208b includes a first face 218 and a second face 220 opposite the first face 218. Second plate 208b includes a plurality of rows of spaced apart slots 222 in a second linear interrupted pattern matching the first linear pattern. The slots 222 extend through the first and second faces 218, 220. When the first and second plates 208a, 208b, are assembled, preferably staked together, to form the compound plate 208, the second face 214 of the first plate 208a abuts the second face 220 of the second plate 208b, such that the rows of rail protrusions 216 extend through the slots 222 and extend from the first face 218 of the second plate. Thus, the protrusions 216 extend into the bay 201 (best illustrated in FIG. 4) for engagement with the grooves 210a, see FIG. 5a.

Figure 5A:
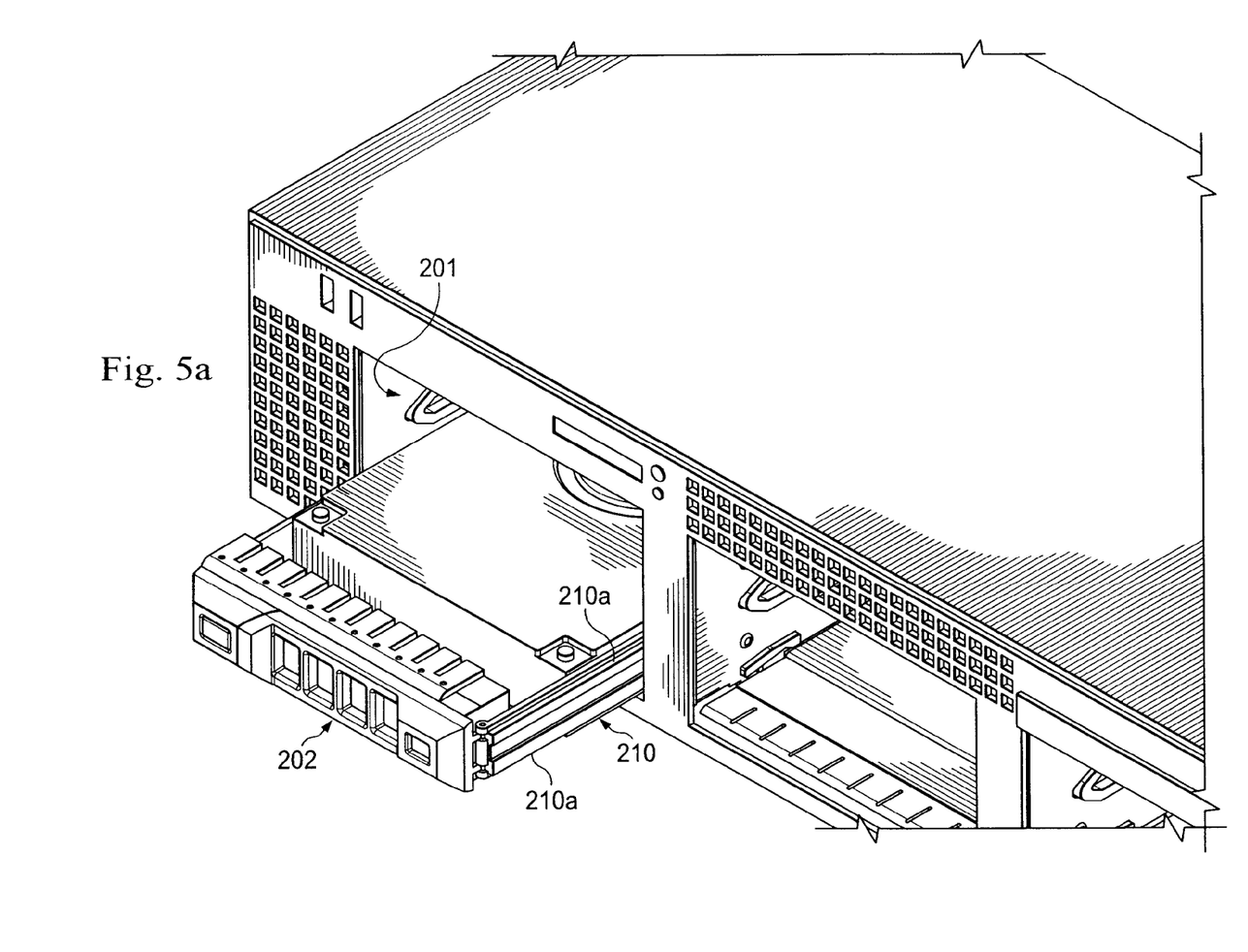
FIG. 5a is a perspective view illustrating an embodiment of a media carrier having grooves in a sidewall.
Figure 6A:
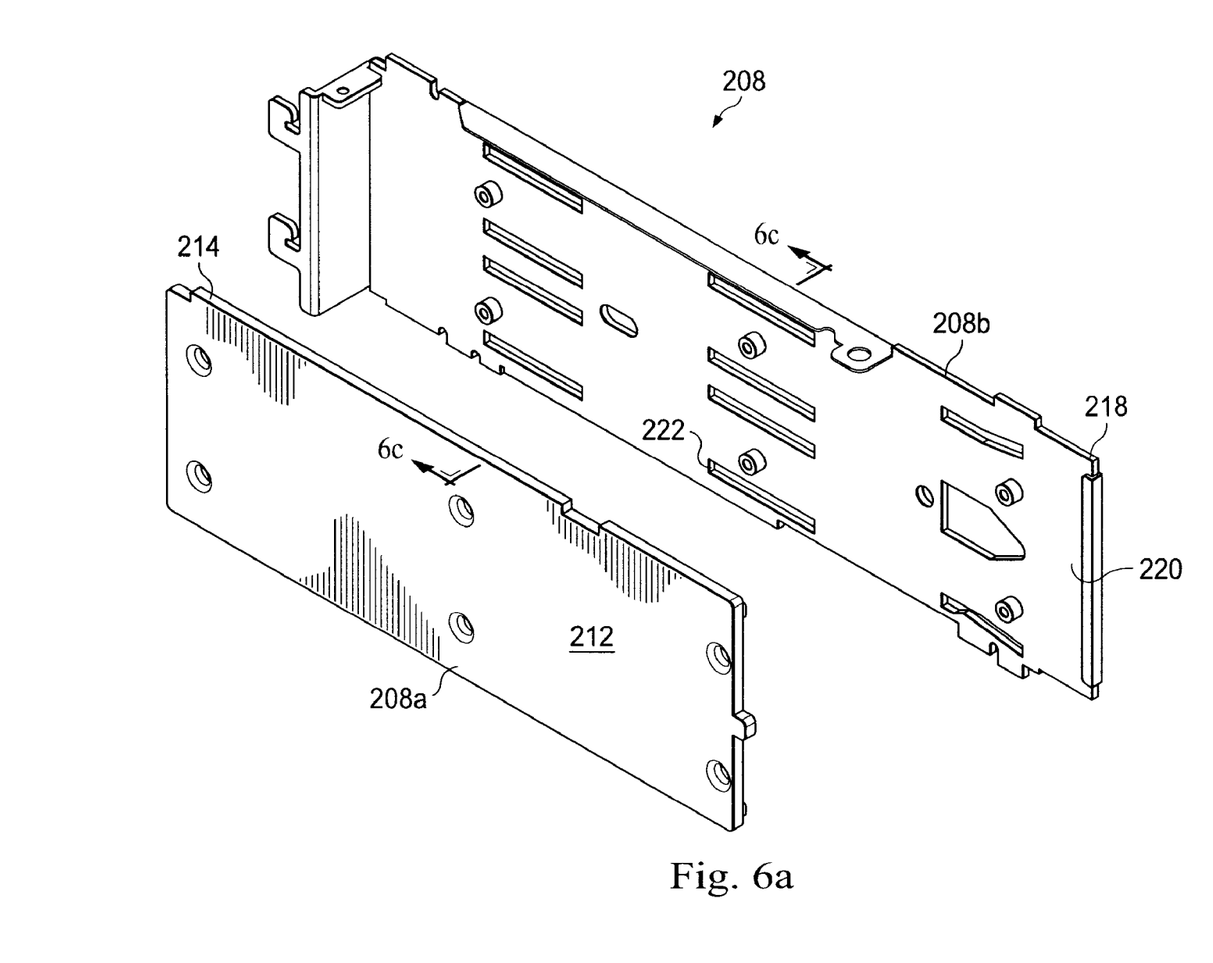
FIGS. 6a and 6b are perspective views illustrating an embodiment of rails for supporting sliding media carriers.
Figure 6B:
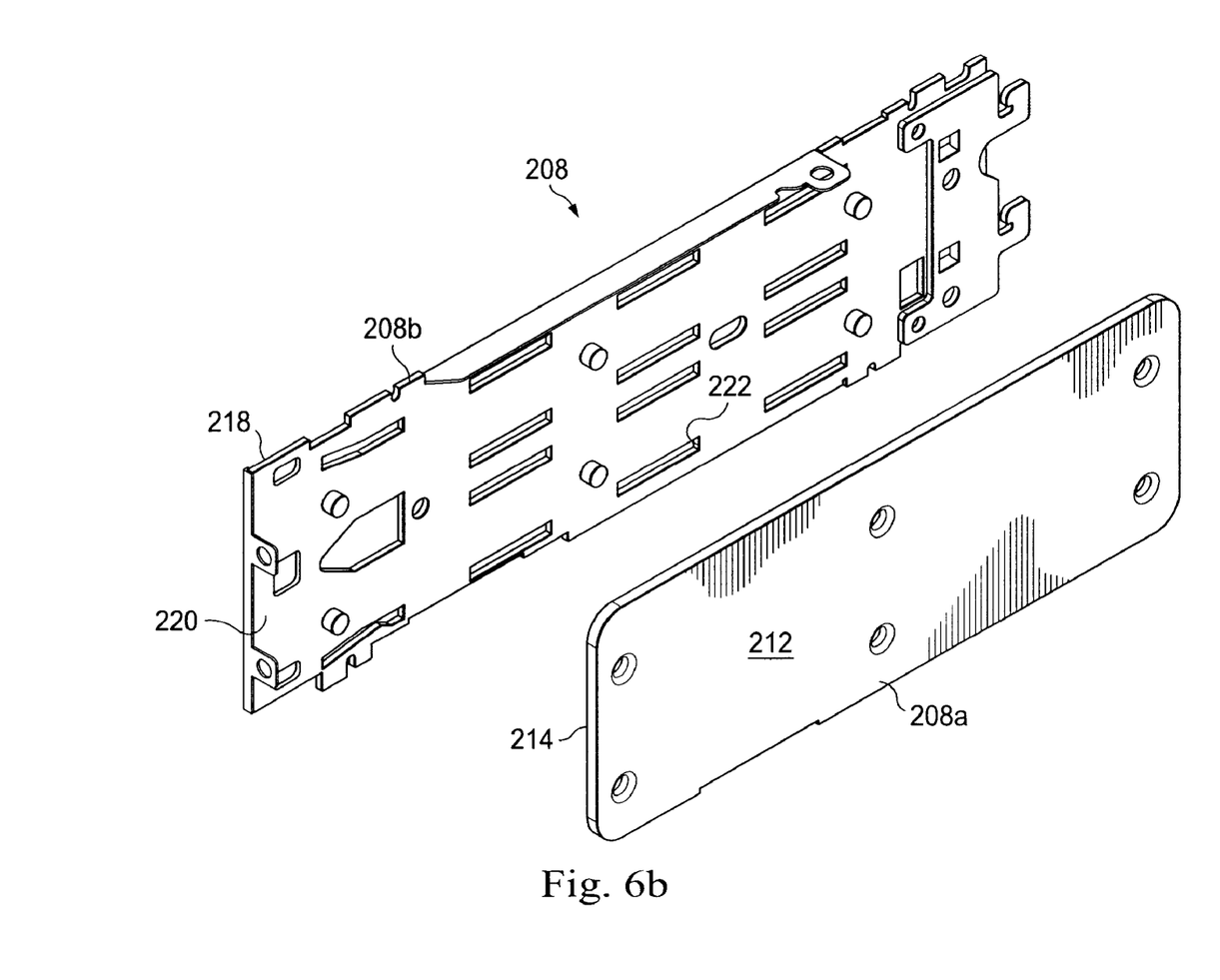
Figure 6C:
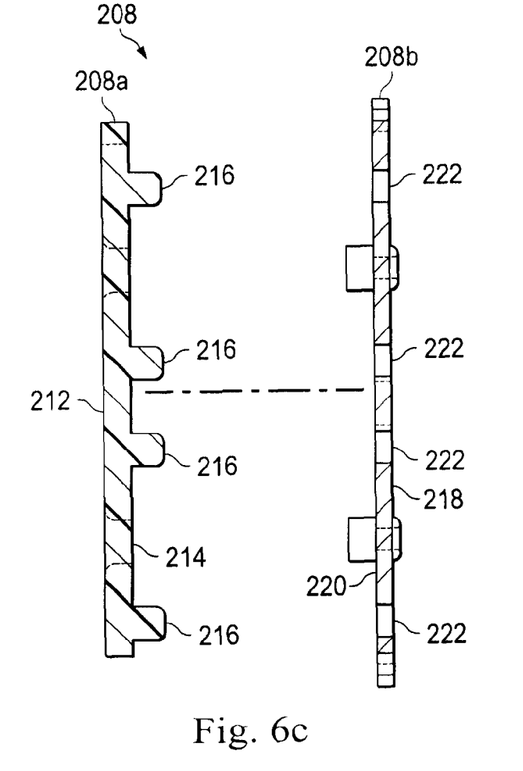
FIGS. 6c and 6d are end views illustrating an embodiment of a rail device formed of two plates.
Figure 6D:
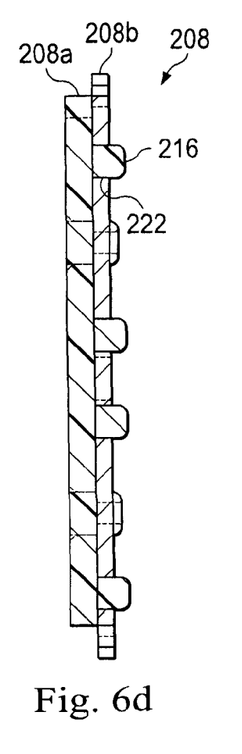
Figure 7:
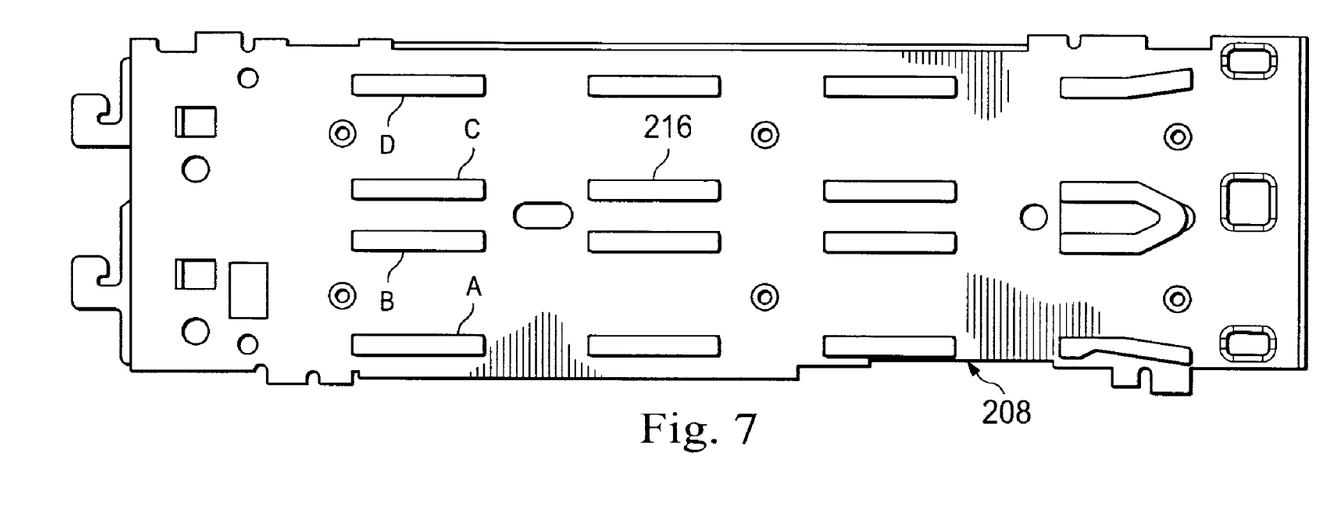
FIG. 7 is a side view illustrating an embodiment of a rail device for supporting two carriers.
Figure 8:
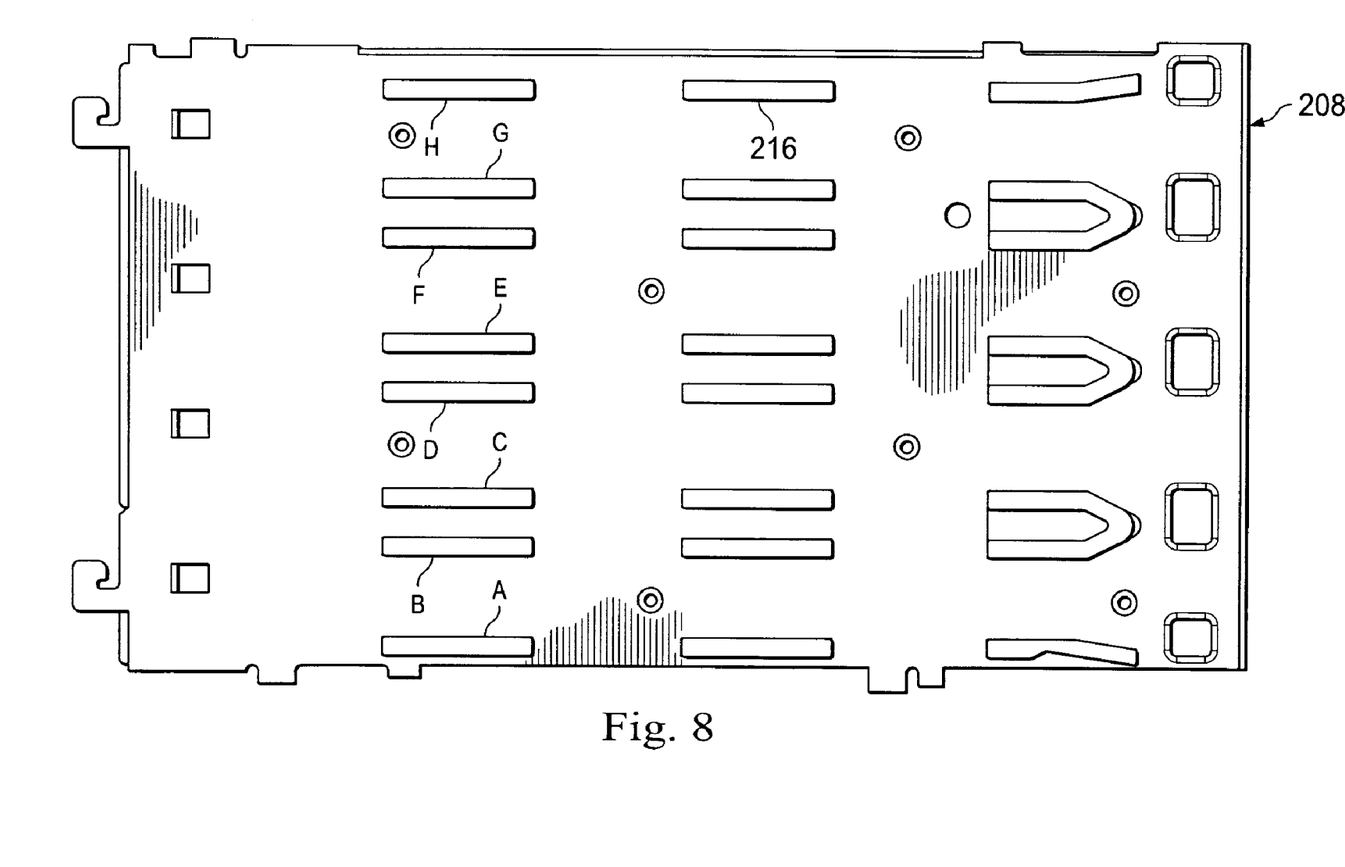
FIG. 8 is a side view illustrating an embodiment of a rail device for supporting four carriers.

It should be noted in FIG. 7, that four rows of protrusions 216 are illustrated in plate 208 such as rows A, B, C and D. Each carrier 202 engages two rows of the protrusions 216. As such, a carrier 202, not shown in FIG. 7, engages rows A and B, and another carrier 202 also not shown in FIG. 7, engages rows C and D, thus stacking the carriers 202 as illustrated in FIG. 5a. Also, in FIG. 8, eight rows of protrusions are illustrated in plate 208 such as rows A, B, C, D, E, F, G and H. As such, these eight rows of protrusions 216 can engage four carriers 202 in a stacked relationship. Clearly, from these embodiments, it can be seen that several combinations of stacking, multiplied by side-by-side stacks, can provide for numerous carriers 202.

Figure 9:
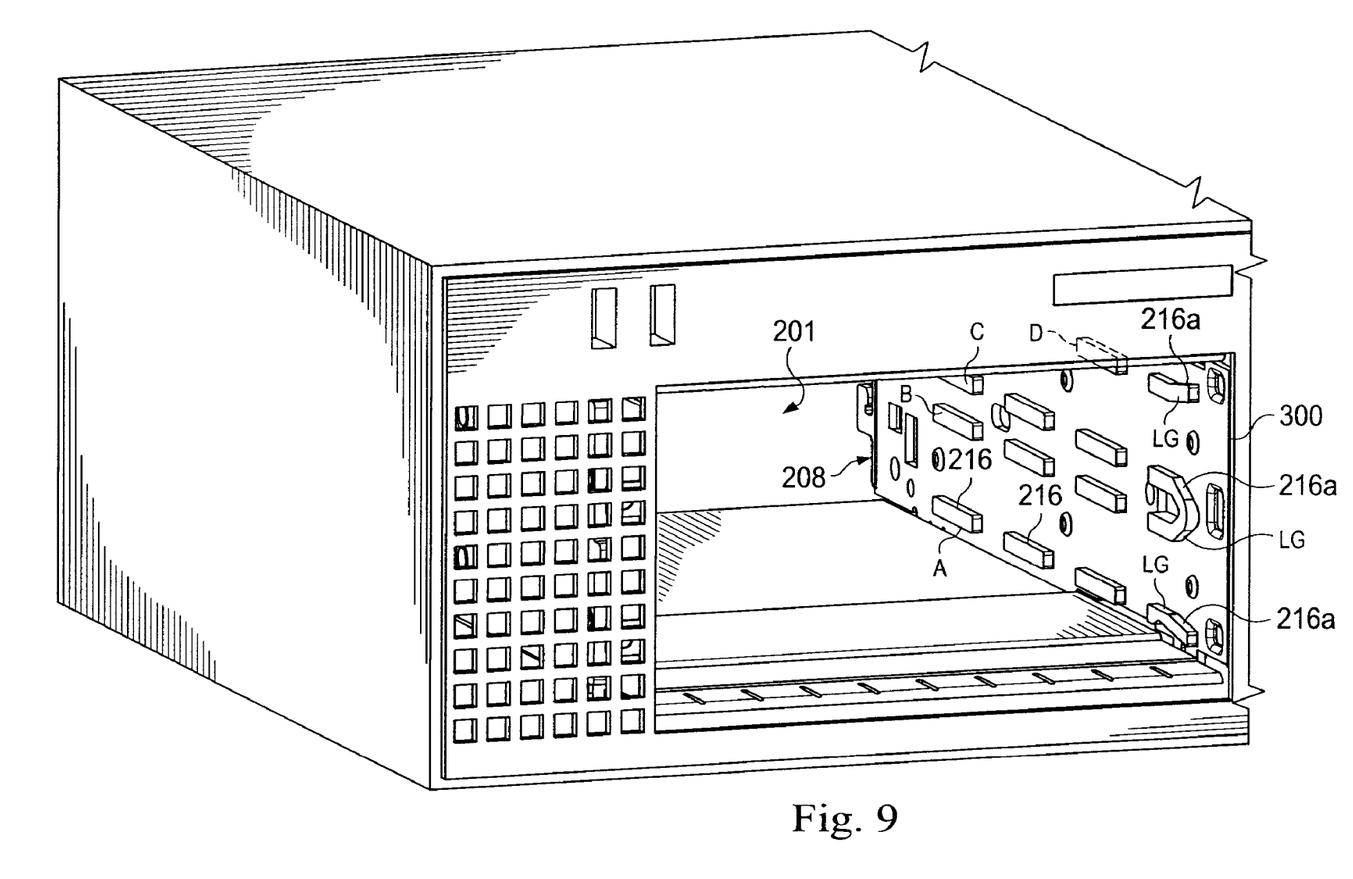
FIG. 9 is a partial perspective view illustrating an embodiment of a media bay including a rail device for supporting multiple carriers.

In FIG. 9, an exemplary bay 201 is illustrated including a view of one of the plates 208 having rows A, B, C and D of protrusions 216. Each row A, B, C and D includes a lead-in guide member LG at an entrance end 300 of the bay 201. Note that the lead-in guide member LG is also one of the protrusions 216 and includes a flared portion 216a for easing the insertion of a carrier (not shown) into engagement with the rows of protrusions. Thus, a carrier being engaged with rows A and B or with rows C and D, will each engage the respective lead-in guide members for ease of insertion.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A hard drive rail apparatus comprising:
   a first plate formed of a synthetic material having a first face and a second face opposite the first face, the first plate having a plurality of rows of spaced apart rail protrusions in a first pattern protruding from the second face of the first plate;
   a second metal plate having a first face and a second face opposite the first face, the second plate having a plurality of rows of spaced apart slots in a second pattern matching the first pattern and extending through the first and second faces of the second plate; and
   the second face of the first plate abutting the second face of the second plate, whereby the rows of rail protrusions extend through the slots and extend from the first face of the second plate.

2. The apparatus of claim 1 wherein the first plate is attached to the second plate.

3. The apparatus of claim 1 wherein each row of rail protrusions includes a plurality of elongated rail members in an interrupted pattern.

4. The apparatus of claim 3 wherein each row of slots includes a plurality of elongated slot members in an interrupted pattern.

5. The apparatus of claim 1 wherein each row of rail protrusions includes a lead-in guide member at a terminal end thereof.

6. A media carrier system comprising:
   a media carrier having a first sidewall and an opposite second sidewall; and the carrier sidewalls each being engaged with a respective rail apparatus, each rail apparatus including:
- a first plate formed of a synthetic material having a first face and a second face opposite the first face, the first plate having a plurality of rows of spaced apart rail protrusions in a first pattern protruding from the second face of the first plate;
- a second metal plate having a first face and a second face opposite the first face, the second plate having a plurality of rows of spaced apart slots in a second pattern matching the first pattern and extending through the first and second faces of the second plate; and
- the second face of the first plate abutting the second face of the second plate, whereby the rows of rail protrusions extend through the slots and extend from the first face of the second plate.

7. The system of claim 6 wherein the first plate is attached to the second plate.

8. The system of claim 6 wherein each row of rail protrusions includes a plurality of elongated rail members in an interrupted pattern.

9. The system of claim 8 wherein each row of slots includes a plurality of elongated slot members in an interrupted pattern.

10. The system of claim 6 wherein each row of rail protrusions includes a lead-in guide member at a terminal end thereof.

11. The system of claim 6 wherein the first and the second sidewalls of the carrier each slide on multiple rows of the rail protrusions.

12. The system of claim 6 wherein a plurality of carriers each slide on respective multiple rows of the rail protrusions.

13. An information handling system (IHS) comprising:
- a chassis;
- a processor mounted in the chassis;
- a memory coupled to the processor;
- a hard drive carrier mounted in the chassis, the hard drive carrier having a first sidewall and an opposite second sidewall; and
- the carrier sidewalls each being engaged with a respective rail apparatus, each rail apparatus including:
  - a first plate formed of a synthetic material having a first face and a second face opposite the first face, the first plate having a plurality of rows of spaced apart rail protrusions in a first pattern protruding from the second face of the first plate;
  - a second metal plate having a first face and a second face opposite the first face, the second plate having a plurality of rows of spaced apart slots in a second pattern matching the first pattern and extending through the first and second faces of the second plate; and
  - the second face of the first plate abutting the second face of the second plate, whereby the rows of rail protrusions extend through the slots and extend from the first face of the second plate.

14. The system of claim 13 wherein the first plate is attached to the second plate.

15. The system of claim 13 wherein each row of rail protrusions includes a plurality of elongated rail members in an interrupted pattern.

16. The system of claim 15 wherein each row of slots includes a plurality of elongated slot members in an interrupted pattern.

17. The system of claim 13 wherein each row of rail protrusions includes a lead-in guide member at a terminal end thereof.

18. The system of claim 13 wherein the first and the second sidewalls each slide on multiple rows of the rail protrusions.

19. The system of claim 13 wherein a plurality of carriers each slide on respective multiple rows of the rail protrusions.

20. The system of claim 13 further comprising:
- a hard drive mounted in the carrier and coupled to the processor.

* * * * *